United States Patent [19]

Hosoda

[11] 4,404,496
[45] Sep. 13, 1983

[54] LIGHT SOURCE APPARATUS USING FLASH DISCHARGE TUBE

[75] Inventor: Seiichi Hosoda, Fuchu, Japan

[73] Assignee: Olympus Optical Co., Ltd., Tokyo, Japan

[21] Appl. No.: 243,565

[22] Filed: Mar. 13, 1981

[30] Foreign Application Priority Data

Mar. 24, 1980 [JP] Japan .................. 55-37174

[51] Int. Cl.³ .......................................... H05B 41/32
[52] U.S. Cl. .................................... 315/151; 315/159; 315/241 P; 354/62; 354/145
[58] Field of Search ..................... 315/151, 159, 241 P; 354/23 D, 33, 60 F, 62, 63, 145

[56] References Cited

U.S. PATENT DOCUMENTS 3,519,879  7/1970  Ogawa ............................... 315/151
3,591,829  7/1971  Murata et al. ...................... 315/151
3,875,471  4/1975  Buck .................................. 315/151

Primary Examiner—Eugene R. La Roche
Attorney, Agent, or Firm—Frishauf, Holtz, Goodman and Woodward

[57] ABSTRACT

A light source apparatus which comprises a flash discharge tube for illuminating a foreground subject, a switching element connected in series with the flash discharge tube, a light receiving circuit for photoelectrically converting light reflected by a foreground subject to produce a signal corresponding to the amount of light reflected from the received foreground subject and a decision circuit for producing an interruption signal for rendering the switching element non-conductive with partially as a function of the output signal of the light receiving circuit. A correction circuit for producing a correction signal in accordance with a preset film sensitivity is further provided. The decision circuit produces the interruption signal when the difference between the output signals of the correction circuit and light receiving circuit is reduced to zero.

3 Claims, 16 Drawing Figures

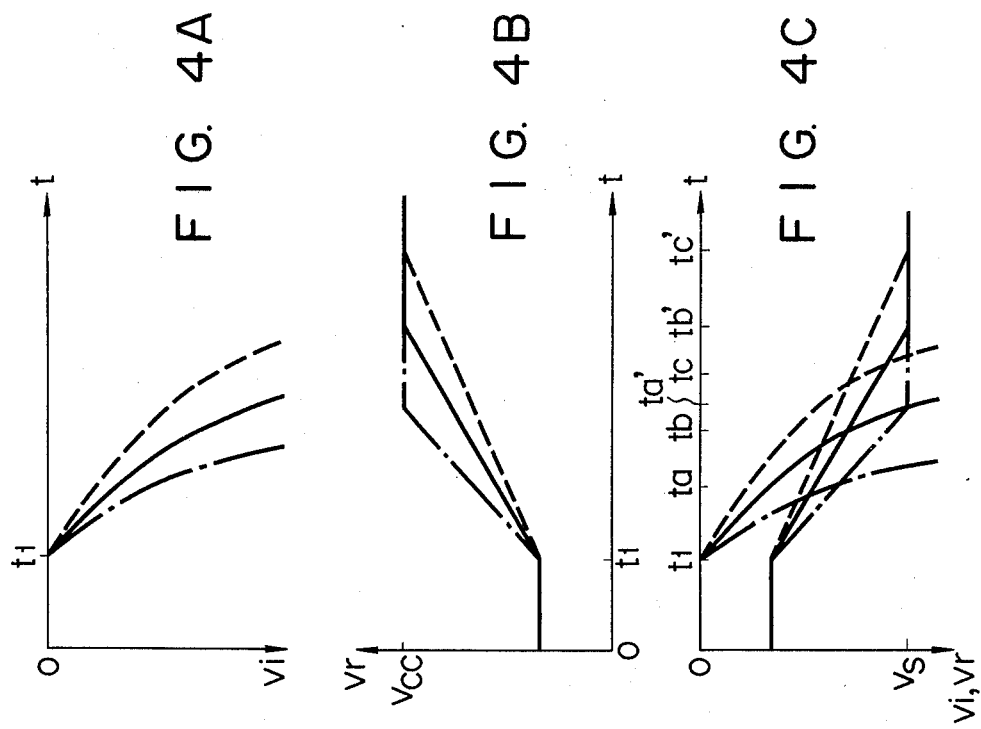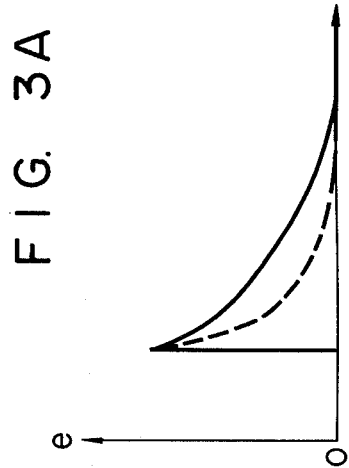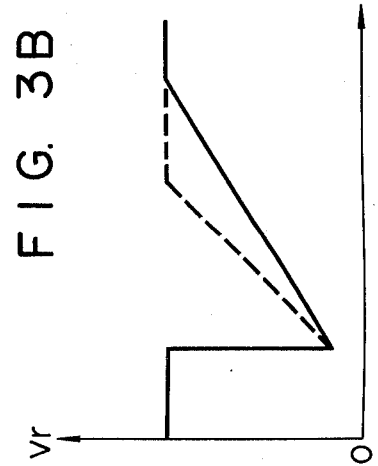

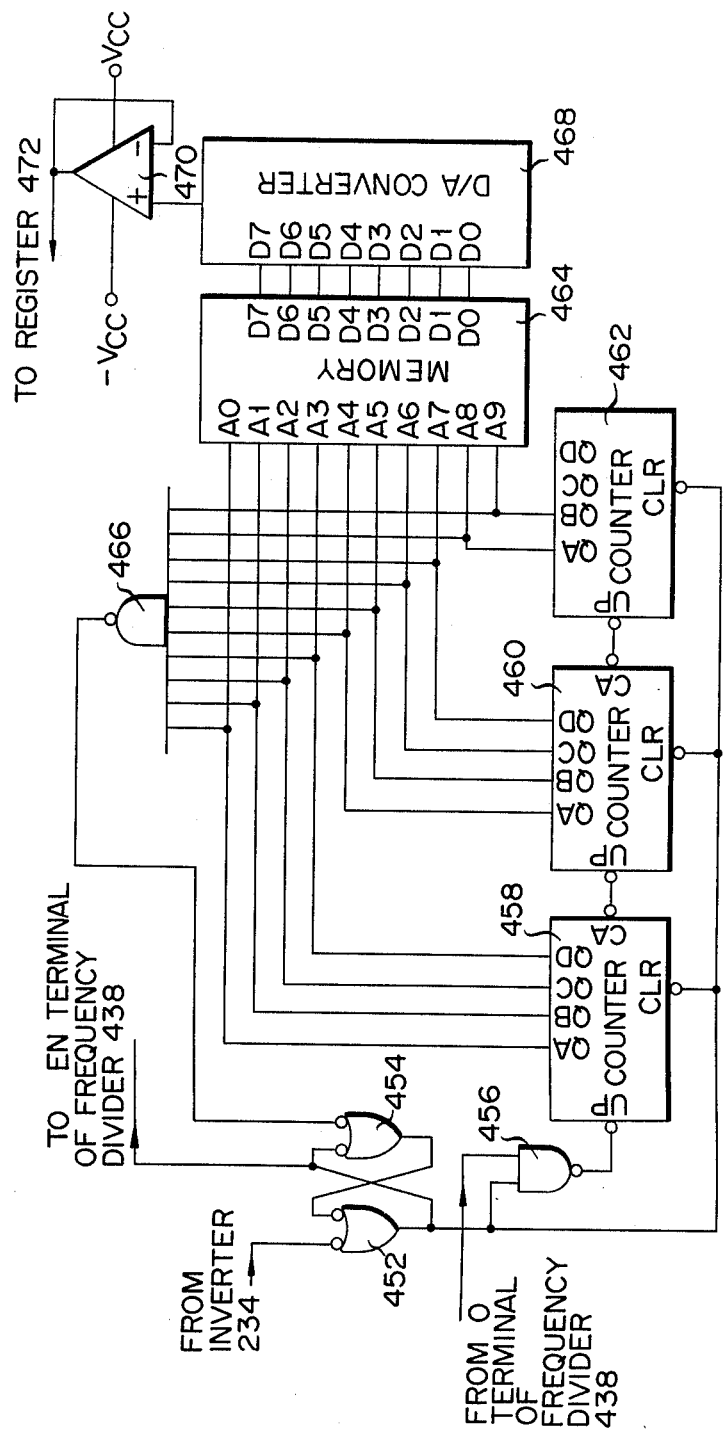
F I G. 7B

LIGHT SOURCE APPARATUS USING FLASH DISCHARGE TUBE

BACKGROUND OF THE INVENTION

This invention relates to a light source apparatus using a flash discharge tube, and more particularly to a light source apparatus in which the light emission of a flash discharge tube is controlled by a semiconductor switching element connected in series with the flash discharge tube.

Recently, a flash discharge tube light emission control circuit has been developed which uses a commonly termed serial control system including a semiconductor switching element connected in series with the flash discharge tube. This circuit also includes a thyristor connected in parallel with the flash discharge tube and an inverting capacitor provided between the thyristor and switching element. The inverting capacitor is charged when the thyristor is triggered by a light emission interruption signal. With the charging of the capacitor the switching element is rendered non-conductive to interrupt the light emission of the flash discharge tube. However, even with this construction, current for charging the inverting capacitor flows through a loop formed by a main capacitor, the flash discharge tube, the inverting capacitor and the thyristor after the switching element is rendered non-conductive, thus charging the inverting capacitor and causing residual light. Also, in a light receiving element for receiving light reflected by a foreground subject, a delay time is involved in the operation of the photoelectric conversion due to the presence of a coupling capacitor for the light receiving element. This leads to a drawback that by the time when the light emission interruption signal is produced the film has already been exposed beyond the proper exposure level. This effect of the time delay is particularly pronounced in case when the light emission period is short, i.e., at the time of the short distance photographing. Also, the extent to which the excessive exposure results varies with the sensitivity of the film.

An object of the invention is to provide a light source apparatus using a flash discharge tube based upon the serial control system, in which the excess of exposure due to the residual light from the flash discharge tube or delay time involved in the photoelectric conversion of the light receiving element is compensated for according to the film sensitivity.

SUMMARY OF THE INVENTION

The above object is realized by a light source apparatus which comprises a power source terminal, a flash discharge tube and a switching element connected in series across the power source terminal, a compensating circuit for providing a compensation signal in accordance with a preset film sensitivity, a light receiving circuit for producing a signal corresponding to the photoelectrically converted light dose, and a decision circuit for comparing the output signals of the compensating circuit and light receiving circuit and producing a signal for rendering the switching element non-conductive when the difference between the two compared signals reaches a predetermined value.

This invention can be more fully understood from the following detailed description when taken in conjunction with the accompanying drawings.

BRIEF DESCRIPTION OF THE DRAWINGS

FIGS. 3A and 3B are graphs illustrating the operational principles of the embodiment of FIG. 1;

FIGS. 4A, 4B and 4C are graphs illustrating the operation of the embodiment of FIG. 1;

FIGS. 7A and 7B show a circuit diagram of an essential part of a light emission control circuit in a third embodiment of the invention.

DETAILED DESCRIPTION

Figure 1:
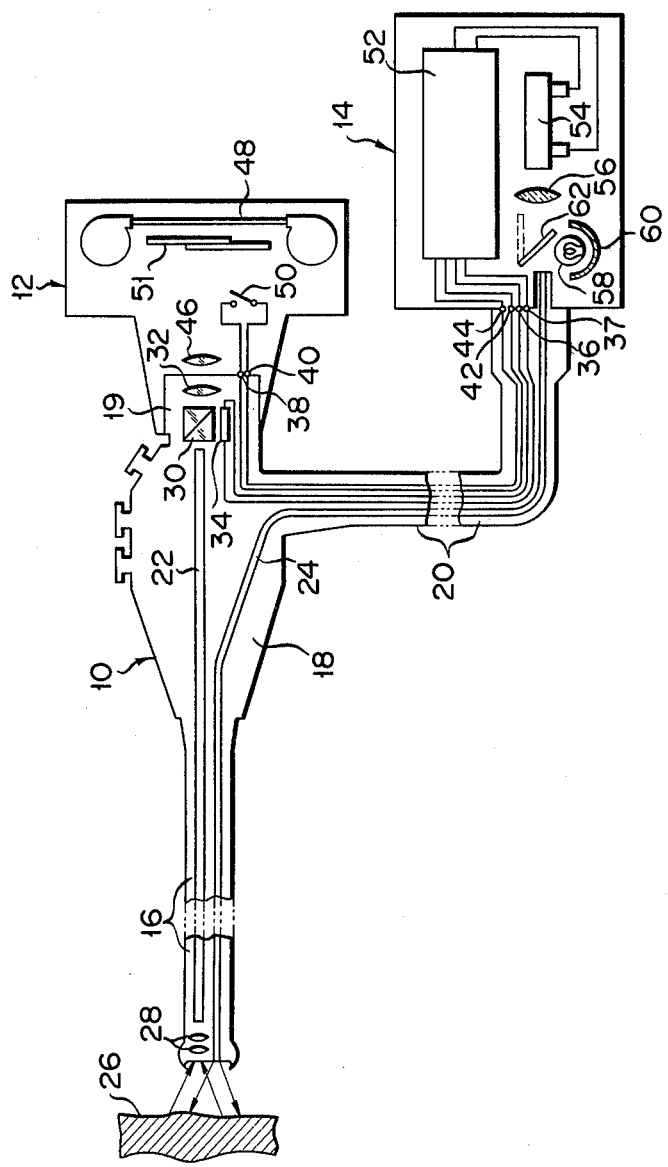
FIG. 1 is a schematic view showing an endoscopic photographing apparatus incorporating an embodiment of the light source apparatus according to the invention.

Now, an embodiment of the light source apparatus using a flash discharge tube according to the invention will be described with reference to FIGS. 1 through 4C. In this embodiment, the invention is applied to an endoscopic photographing apparatus. FIG. 1 shows a schematic view of the endoscopic photographing apparatus incorporating the embodiment of the light source apparatus. The endoscopic photographing apparatus has an endoscope 10, a camera 12 and a light source section 14. The endoscope 10 includes a flexible section 16 which is adapted to be inserted into the body cavity of the man, an operating section 18 for operating the flexible section 16, an eyepiece section 19 which is connected to the camera 12 and a connecting tube 20 which is connected to the light source section 14. The flexible section 16 is provided with an image guide 22 and a light guide 24 as respective optical fiber bundles. Both the image guide 22 and light guide 24 extend through the flexible section 16 up to the end thereof. The other end portion of the image guide 22 extends up to the close proximity of the eyepiece section 19, and the other end portion of the light guide 24 extends through the connection tube 20 and reaches the light source section 14. At the end of the flexible section 16, an objective lens system 28 is provided for focusing the image of a body cavity membrane 26 on the end of the image guide 22. The image obtained from the objective lens system 28 is transmitted through the image guide 22 to a half prism 30 and thence to an eyepiece lens 32. The image incident on the prism 30 is also splitted thereby to be incident on a light receiving element (here a photodiode) 34. The output signal from the light receiving element 34 is fed through terminals 36 and 37 provided at the end of the connection tube 20 to the light source section 14. The end of the eyepiece section 19 is provided with terminals 38 and 40, which are led by leads to respective terminals 42 and 44 provided at the end of the connection tube 20.

The camera 12 which is connected to the eyepiece section 19 of the endoscope 10 includes a photographing lens 46, a film 48, a synchronization switch 50 and a shutter 51. When the camera 12 is mounted on the endoscope 10, the opposite terminals of the synchronization switch 50 are connected to the respective terminals 38 and 40 provided at the end of the eyepiece section 19.

The light source section 14 includes a light emission control circuit 52 connected to the terminals 36, 37, 42 and 44 provided at the end of the connecting tube 20, a flash discharge tube 54 controlled by the light emission control circuit 52, a condenser 56 for condensing light emitted from the discharge tube 54 onto the end of the light guide 24, a lamp 58 which is used not when taking a photograph but when making the endoscopic diagnosis a reflector 60 for gathering light emitted from the lamp 58 and a movable mirror 62 for selectively leading light from the flash discharge tube 54 or light from the lamp 58 to the end of the light guide 24.

Figure 2A:
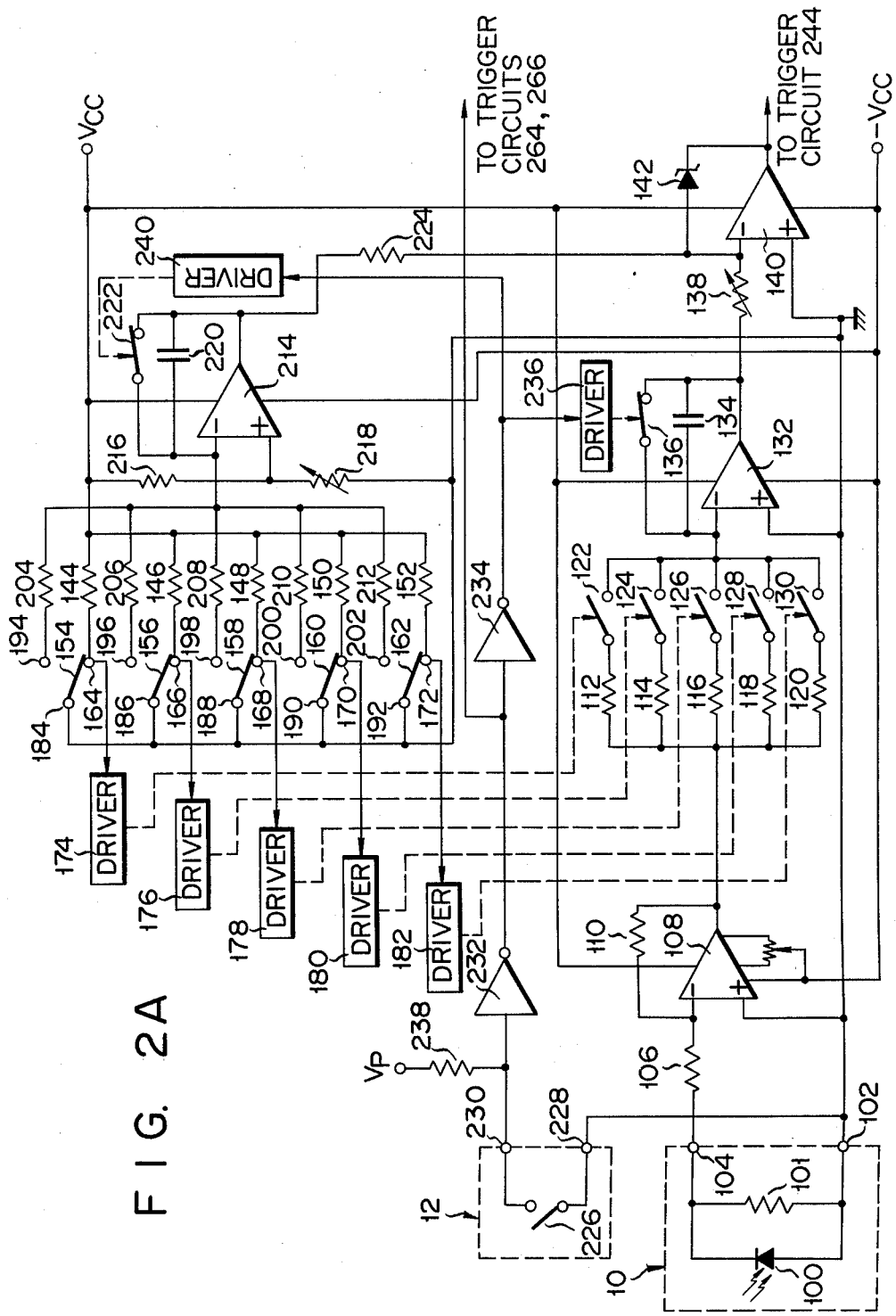
FIGS. 2A and 2B show a circuit diagram of a light emission control circuit in the embodiment of FIG. 1.
Figure 2B:
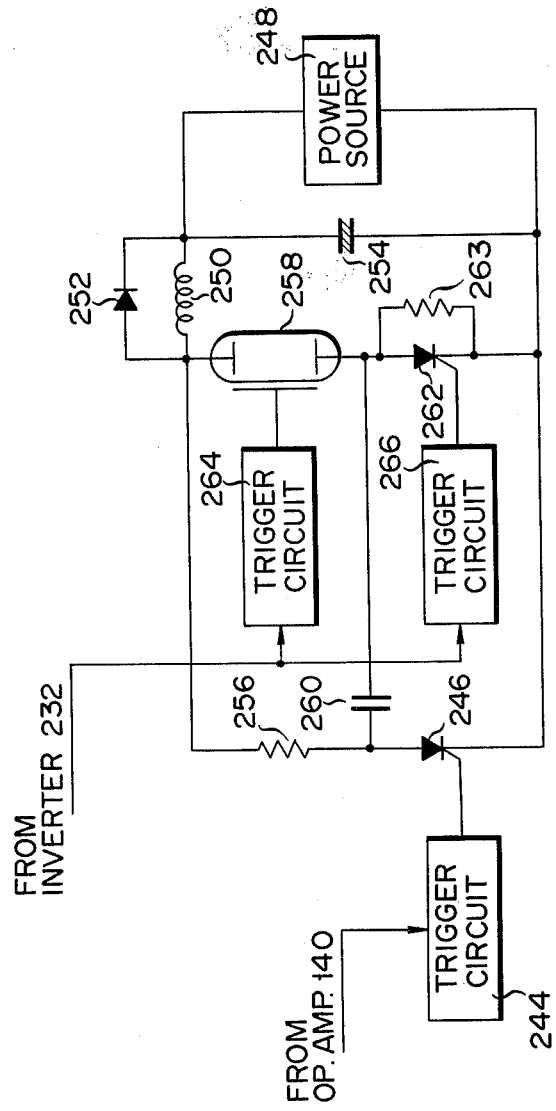

FIGS. 2A and 2B show a circuit diagram of the electric construction of the light emission circuit 52 in the light source section 14. A photodiode 100 in the endoscope 10 is connected in parallel with a resistor 101, and its anode and cathode are connected to respective terminals 102 and 104. The terminal 102 is grounded, and the terminal 104 is connected through a resistor 106 to an inverting input terminal of an operational amplifier 108, a noninverting input terminal of which is grounded. The output terminal of the operational amplifier 108 is connected through a resistor 110 to its inverting input terminal and is also connected through resistors 112, 114, 116, 118 and 120 of different resistances to respective switches 122, 124, 126, 128 and 130, which are in turn connected to an inverting input terminal of an operational amplifier 132, which has its noninverting input terminal grounded. The output terminal of the operational amplifier 132 is connected through a capacitor 134 to its inverting input terminal. A switch 136 is connected across the capacitor 134. The output terminal of the operational amplifier 132 is also connected through a variable resistor 138 to an inverting input terminal of an operational amplifier 140, which has its noninverting input terminal grounded and its output terminal connected through zener diode 142 in a reverse direction to its inverting input terminal.

A positive power supply terminal $V_{cc}$, for example, at +15 V is connected through resistors 144, 146, 148, 150 and 152 to first movable contacts 164, 166, 168, 170 and 172 of respective select switches 154, 156, 158, 160 and 162. The first fixed contacts 164, 166, 168, 170 and 172 are connected to respective drivers 174, 176, 178, 180 and 182 for controlling the respective switches 122, 124, 126, 128 and 130. The switches 154, 156, 158, 160 and 162 have their fixed contacts 184, 186, 188, 190 and 192 grounded. Their second movable contacts 194, 196, 198, 200 and 202 are connected through respective resistors 204, 206, 208, 210 and 212 to an inverting input terminal of an operational amplifier 214. The switches 154, 156, 160 and 162 are interlocked to a film sensitivity selector (not shown) provided in the light source section 14. A resistor 216 and a variable resistor 218 are connected in series between the power supply terminal $V_{cc}$ and ground, and the juncture between the resistor 216 and variable resistor 218 is connected to a noninverting input terminal of the operational amplifier 214. The voltage between positive power supply terminal $V_{cc}$ and negative power supply terminal $-V_{cc}$, for example, at −15 V is supplied as operating voltage to the operational amplifiers 108, 132, 140 and 214. The operational amplifier 214 has its output terminal connected through a capacitor 220 to its inverting input terminal, and a switch 222 is connected across the capacitor 220. The output terminal of the operational amplifier 124 is connected through a resistor 224 to the inverting input terminal of the operational amplifier 140.

A synchronization switch 226 in the camera 12 is connected between terminals 228 and 230. The terminal 230 is connected through inverters 232 and 234 in series with each other to a driver 236 for controlling the switch 136. A constant power supply terminal $V_p$, e.g., at +5 V is connected through a resistor 238 to the input terminal of the inverter 232. The output terminal of the inverter 234 is also connected to a driver 240 for controlling the switch 222.

The operational amplifier 140 has its output terminal connected to an input terminal of a trigger circuit 244. The trigger circuit 244 has its output terminal connected to a gate terminal of a thyristor 246. The positive side terminal of a power source 248 is connected to one end of an inductor 250 and also to a cathode of a diode 252. An electrolytic capacitor 254 is connected in parallel with the power source 248. The other end of the inductor 250 and anode of the diode 252 are commonly connected through a resistor 256 to an anode of the thyristor 246. The negative side terminal of the power source 248 is connected to a cathode of the thyristor 246. The juncture between the anode of the diode 252 and inductor 250 is also connected to one electrode of a flash discharge tube 258. The other electrode of the flash discharge tube 258 is connected through a capacitor 260 to the anodes of the thyristors 246 and 262. A cathode of the thyristor 262 is connected to the negative side terminal of the power source 248. A resistor 263 is connected between the anode and cathode of the thyristor 262. The output terminal of the inverter 232 is connected to an input terminals of trigger circuits 264 and 266, which have their output terminals respectively connected to a trigger terminal of the flash discharge tube 258 and a gate terminal of the thyristor 262.

Now the operation of this embodiment will be briefly described with reference to FIG. 1. It is assumed that the movable mirror 62 is in the illustrated state so that light emitted from the lamp 58 is led through the light guide 24 to illuminate the body cavity membrane 26. The operator determines the phorographing spot or area by manipulating the flexible section 16. When a shutter button (not shown) of the camera 12 is depressed, the camera shutter 51 is released, and at the same time the synchronization switch 50 is closed. As a result, a mirror drive section (not shown) in the light source section 14 is energized to move the movable mirror 62 to a state as shown by a broken line in FIG. 1. With this movement of the movable mirror 62, light emitted from the flash discharge tube 54 can be incident upon the end of the light guide 24. The flash discharge tube 54 is caused to commence light emission in accordance with the closure of the synchronization switch 50. Light emitted from the flash discharge tube 54 is gathered by the condenser lens 56 to be directed to the end of the light guide 24, led therethrough and projected from an illumination window provided at the end of the flexible section 16 onto the body cavity membrane 26. Light reflected by the body cavity membrane 26 is transmitted through the objective lens 28 to the image guide 22, and the optical image of the foreground subject is focused through the objective lens 28 on the end of the image guide 22. This light image is coupled through the image guide 22 and half prism 30 to be incident on the film 48 and also on the photodiode 34. The photodiode 34 electrically converts the incident light to provide an electric signal which is fed to the light emission control circuit 52 in the light source section 14. The light emission control circuit 52 interrupts the light emission of the flash discharge tube 54 after a predetermined period of time from the commencement of the light emission according to the output signal from the photodiode 34. In this way, the foreground subject can be photographed with the proper exposure. In the endoscopic photographing, the interruption of the light emission of the light source brings an end to the photographing since the interior of the body cavity is dead dark. After the lapse of a predetermined shutter period, the camera shutter is closed to open the synchronization switch 50, thus switching the movable mirror 62 to the initial state shown in FIG. 1, permitting light from the lamp 58 to be led to the light guide 24.

Now, the operation of the light emission control circuit 52 will be described. First, the principles of the operation will be discussed. As has been mentioned previously, the excess (or error) of exposure due to the residual light or delay time varies with the photographing distance (i.e., flash light emission period) or the sensitivity of the film. In the endoscopic photographing, the foreground subject image size on the film varies with the kind of endoscope used (mainly with the image guide diameter thereof), and this means that the apparent sensitivity of the film varies with the foreground subject image size even though the actual film sensitivity may be the same. FIG. 3A shows the relation between the error e and light emission period t. A solid curve here is for the case of low film sensitivity, and a broken curve is for the case of high film sensitivity. Here, the characteristics do not start from point t=0 because in practice there is no possibility that light is interrupted at the point t=0, and they are obtained for a range from the point corresponding to the shortest distance photographing. For this reason, the light signal produced from the photodiode may be compensated for in a manner as shown in FIG. 3B. As the compensation signal $V_r$ to this end, the linear signal as shown in FIG. 3B may be readily used. In FIG. 3B, a solid line is for the case of low film sensitivity, and a broken line is for the case of high film sensitivity. Under the principles discussed above, the light emission control circuit 52 operates as follows. It is assumed that the individual switches are in the illustrated states. Prior to taking a photograph, the operator sets the film sensitivity selector to a predetermined sensitivity. When this is done so, one of the switches 154, 156, 158, 160 and 162 is switched to the second movable contact side. It is now assumed that a medium sensitivity is set, so that the switch 158 is switched to the second movable contact side. While in the illustrated example five film sensitivity levels are available for selection, where a greater film sensitivity range is covered the number of switches may be increased.

With the switching of the switch 158 to the second movable contact side, a high (H) level signal is supplied through the resistor 148 to the driver 178 to energize this driver 178, thus closing the switch 126. At the same time, the inverting input terminal of the operational amplifier 214 is grounded through the resistor 208 and second movable contact 198 and fixed contact 188 of the switch 158.

When the camera shutter button is subsequently depressed, the synchronization switch 226 is closed, causing an H level output to appear from the output terminal of the inverter 232. With this H level signal, the trigger circuits 264 and 266 are energized to render the thyristor 262 conductive and thus trigger the flash discharge tube 258. In this way, light is emitted from the flash discharge tube 258. At the same time, the movable mirror 62 is brought to the state shown by broken lines in FIG. 1, and thus the body cavity membrane 26 is illuminated by the emitted flash light. At this time, a low (L) level output appears from the output terminal of the inverter 234 to de-energize the drivers 236 and 240, thus opening the switches 136 and 222.

Light reflected by the foreground subject is incident on the photodiode 100 to cause current therefrom. This current produces a voltage drop across the load resistor 101. This voltage is amplified as a brightness signal by the operational amplifier 108. Since only the switch 126 among the switches 122, 124, 126, 128 and 130 is closed, the amplified brightness signal is fed through the resistor 116 to the inverting input terminal of the operational amplifier 132. The resistor 116 at this time forms an integrating circuit together with the operational amplifier 132 and the capacitor 134 connected between the output terminal and inverting input terminal of the operational amplifier 132. The time constant of the integrating circuit is determined by the capacitor 134 and the resistor 116 connected to the inverting terminal of the operational amplifier 132. In other words, the time constant is determined by the state of the switches 122, 124, 126, 128 and 130, i.e., the state of the film sensitivity selector. Since the rate of variation of the intensity of light emitted from the flash discharge tube 258 increases with the lapse of time, the output voltage $V_i$ from the operational amplifier 132 sharply reduces with time t in the manner as shown by a solid curve in FIG. 4A. Here, it is assumed that the synchronization switch 226 is closed at instant $t=t_1$. While the time constant of the integrating circuit is determined by the film sensitivity, for a lower film sensitivity the select switch 154 or 156 is selected to close the switch 122 or 124 so as to connect the resistor 112 or 114 to the inverting input terminal of the operational amplifier 132. For a higher film sensitivity the select switch 160 or 162 is selected to close the switch 128 or 130 so as to connect the resistor 118 or 120 to the inverting input terminal of the operational amplifier 132. The resistors 112, 114, 116, 118 and 120 have increasing resistances in the mentioned order, and also the resistors 204, 206, 208, 210 and 212 have increasing resistances in the mentioned order. In other words, the time constant of the integrating circuit 132 is reduced with reduction of the film sensitivity and increased with increase thereof. In FIG. 4A, a broken curve is for the lower film sensitivity, and a dot and bar curve is for the higher film sensitivity.

Meanwhile, the resistor 208 at this time forms an integrating circuit together with the operational amplifier 214 and the capacitor 220 connected between the output terminal and inverting input terminal of the operational amplifier 214, since the inverting input terminal thereof is grounded through the resistor 208. Since the juncture between the resistor 216 and variable resistor 218 connected in series between the power supply terminal $V_{cc}$ and ground is connected to the noninverting input terminal of the operational amplifier 214, the output voltage $V_r$ of the operational amplifier 214 in the closed state of the switch 222 is expressed as follows:

$$V_r = \frac{R_1}{R_1 + R_2} V_{cc}$$

where $R_1$ and $R_2$ are the resistances of the resistors 218 and 216, respectively. After the opening of the switch 222, from which time the charging of the capacitor 220 commences, the output voltage $V_r$ is increased according to the time constant of the integrating circuit, i.e., the product of the capacitance of the capacitor 220 and the resistance of the resistor 208. When the voltage $V_r$ reaches $V_{cc}$, it is no longer changed but is held at this level. This characteristic is shown in FIG. 4B. In the Figure, a broken line is for the lower film sensitivity, and a dot and bar line is for the higher film sensitivity. The output signal $V_i$ of the operational amplifier 132 is coupled through the variable resistor 138, and the output signal $V_r$ of the operational amplifier 124 is coupled through the resistor 224, to the inverting input terminal of the operational amplifier 140.

Immediately after the closure of the synchronization switch 226, the exposure of the film is still little in extent and the output signal $V_i$ of the operational amplifier 132 is less than the output signal $V_r$ of the operational amplifier 214. In this stage, the inverting input terminal of the operational amplifier 140 is thus at the positive potential, and an L level output is produced from the output terminal of the operational amplifier 140. The output signal $V_r$ of the operational amplifier 214 is shown in the inverted form in FIG. 4C for comparison with the output signal $V_i$ from the operational amplifier 132. The variable resistor 138 is adjusted such that the maximum value of the output signal $V_r$ of the operational amplifier 214 coincides with the proper exposure value $V_S$ of the output signal $V_i$ of the operational amplifier 132, i.e., the foreground subject brightness signal.

As time is elapsed from the closure of the synchronization switch 226, the output signal $V_i$ of the operational amplifier 132 turns to sharply decrease, and at an instant $t=t_b$ the absolute values of the output signals $V_i$ and $V_r$ of the operational amplifiers 132 and 214 coincide with each other, and the input to the inverting input terminal of the operational amplifier 140 is reduced to zero level. After the instant $t=t_b$, the output signal $V_r$ of the operational amplifier 214 is greater than the output signal $V_i$ of the operational amplifier 132, and an H level signal is produced from the output terminal of the operational amplifier 140. As a result, the trigger circuit 244 is energized to trigger the thyristor 246. With the triggering of the thyristor 246 the thyristor 262 is reversely biased by the voltage across the inverting capacitor 260 and is thus cut off, whereby the light emission of the flash discharge tube 258 is interrupted. The light emission of the flash discharge tube 258 is interrupted at an instant $t=t_a$ in case of the higher film sensitivity and at an instant $t=t_c$ in case of the lower film sensitivity.

It will be appreciated that in this embodiment the exposure period is determined according to the difference between the compensation signal $V_r$ corresponding to the film sensitivity provided by the operational amplifier 214 and the integral output signal $V_i$ obtained from the output signal of the photodiode 100. Thus, there is no possibility for the excess of exposure to result. Without the compensating signal, the light emission is interrupted at an instant $t_b'$, at which time the integral output signal $V_i$ becomes the proper value $V_S$, so that excess of exposure results. Likewise, the light emission is interrupted at an instant $t=t_a'$ in case of the higher film sensitivity and at an instant $t=t_c'$ in case of the lower film sensitivity.

Figure 5:
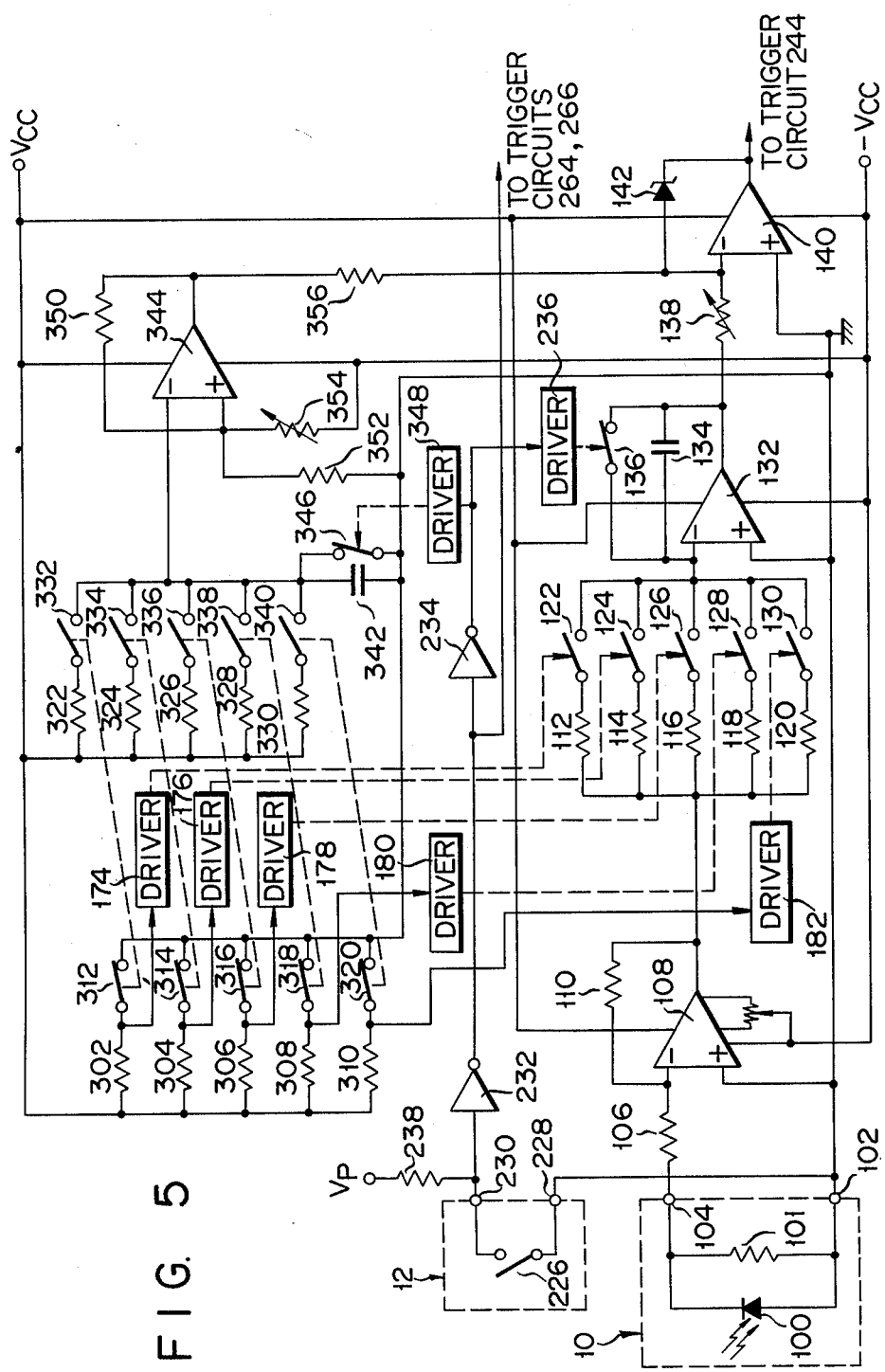
FIG. 5 is a circuit diagram showing an essential part of a light emission control circuit in a second embodiment of the invention.

Now, another embodiment of the light source apparatus according to the invention will be described. In the following description, like parts as those in the preceding embodiment are denoted by like reference numerals, and their detailed description is omitted. FIG. 5 shows a circuit diagram of an essential part of a light emission control circuit in a second embodiment. A power supply terminal $V_{cc}$ is connected through pull-up resistors 302, 304, 306, 308 and 310 to switches 312, 314, 316, 318 and 320, which are grounded at the other end, and also to drivers 174, 176, 178, 180 and 182. The power supply terminal $V_{cc}$ is also connected through resistors 322, 324, 326, 328 and 330 to switches 322, 334, 336, 338 and 340. The switches 332, 334, 336, 338 and 340 are interlocked to respective switches 312, 314, 316, 318 and 320 such that when one of the switches in each pair is closed the other switches are opened and vice versa. The switches 312, 314, 316, 318 and 320 are also interlocked to the film sensitivity selector. The switches 332, 334, 336, 338 and 340 are connected at the other end through a capacitor 342 to ground and also connected to an inverting input terminal of an operational amplifier 344. A switch 346 is connected across the capacitor 342. The output terminal of the inverter 234 is connected to a driver 348 for controlling the switch 346. The output terminal of the operational amplifier 344 is connected through a resistor 350 to its noninverting input terminal. The noninverting input terminal of the operational amplifier 344 is grounded through a resistor 352 and is connected through a variable resistor 354 to a negative power supply terminal $-V_{cc}$. The output terminal of the operational amplifier 344 is connected through a resistor 356 to the inverting input terminal of the operational amplifier 140. The other part of the circuit is the same as the preceding first embodiment, so it is not shown in the Figure.

The operation of the light emission control circuit in the second embodiment will now be described. In the initial state, the individual switches are as shown in the Figure. By setting the film sensitivity selector, one of the switches 312, 314, 316, 318 and 320 is opened to close the corresponding one of the switches 332, 334, 336, 338 and 340. It is now assumed that the film sensitivity is set to the medium sensitivity to open the switch 316 and close the switch 336. Like the first embodiment, the switch 312 or 314 is selected in case of lower film sensitivity, and the switch 318 or 320 in case of higher film sensitivity. Also, the resistors 302, 304, 306, 308 and 310 have increasing resistances in the mentioned order, and the resistors 322, 324, 326, 328 and 330 have increasing resistances in the mentioned order. At the instant moment, the driver 178 is thus energized to close the switch 126.

With the subsequent closure of the synchronization switch 226 caused by depressing the camera shutter button, the trigger circuits 264 and 266 are energized to cause light emission from the flash discharge tube 258 while also causing movement of the movable mirror 62. Thus, light emitted from the flash discharge tube 258 is led through the light guide 24 to illuminate the body cavity membrane 26.

Figure 6A:
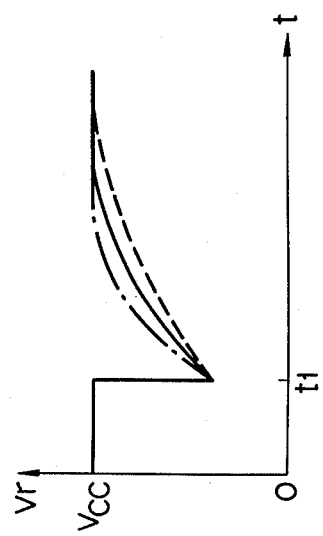
FIGS. 6A and 6B are graphs illustrating the operation of the second embodiment.

Also, with the closure of the synchronization switch 266 an L level output appears from the output terminal of the inverter 234 to de-energize the drivers 236 and 348 to open the switches 136 and 346. With the opening of the switch 346, the capacitor 342 is exponentially charged according to the time constant of the circuit formed by the resistor 326 and capacitor 342. Denoting the capacitance of the capacitor 342 by C, the resistance of one of the resistors 322, 324, 326, 328 and 330 (here the resistor 326) by R and the time elapsed from the instant of opening of the switch 346, i.e., the closure of the synchronization switch 226, by t, the terminal voltage $V_r$ across the capacitor 342 is given as $$V_r = V_{cc}(1 - \exp(-t/CR))$$

and this voltage is as shown in FIG. 6A. In FIG. 6A, a broken curve is for the case of lower film sensitivity, and a dot and bar curve is for the case of higher film sensitivity.

With the opening of the switch 136, the operational amplifier 132 commences the integration of the output signal of the photodiode 100 like the first embodiment, and the output signal $V_i$ of the operational amplifier 132 has characteristics as shown in FIG. 4A.

Figure 6B:
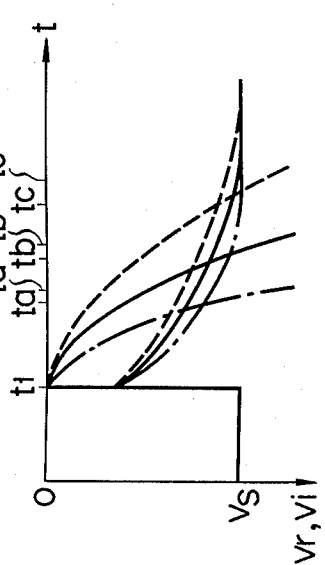

The terminal voltage across the capacitor 342 is coupled to the inverting input terminal of the operational amplifier 344, and the output signal $V_i$ and $V_r$ of the operational amplifier 132 and 344 are coupled through the variable resistor 138 and resistor 356 respectively to the inverting input terminal of the operational amplifier 140. Since the output signals $V_i$ and $V_r$ have opposite polarities, when their absolute values coincide, an H level signal is produced from the output terminal of the operational amplifier 140 to energize the trigger circuit 244, thus triggering the thyristor 246 to interrupt the light emission of the flash discharge tube 258. The relation of the output signals $V_i$ and $V_r$ to each other is shown in FIG. 6B, the voltage $V_r$ being shown as inverted form. The resistance of the variable resistor 138 is set such that the maximum value of the output signal $V_r$ of the operational amplifier 344 coincides with the proper $V_s$ (i.e., the proper exposure value of the output signal $V_i$ of the operational amplifier 132).

It will be appreciated that in the second embodiment the exposure value is determined according to the signal $V_r$ which changes as an exponential function approximating the error curve shown in FIG. 3A, so that it is possible to obtain more faithful compensation than with the previous first embodiment.

Figure 7A:
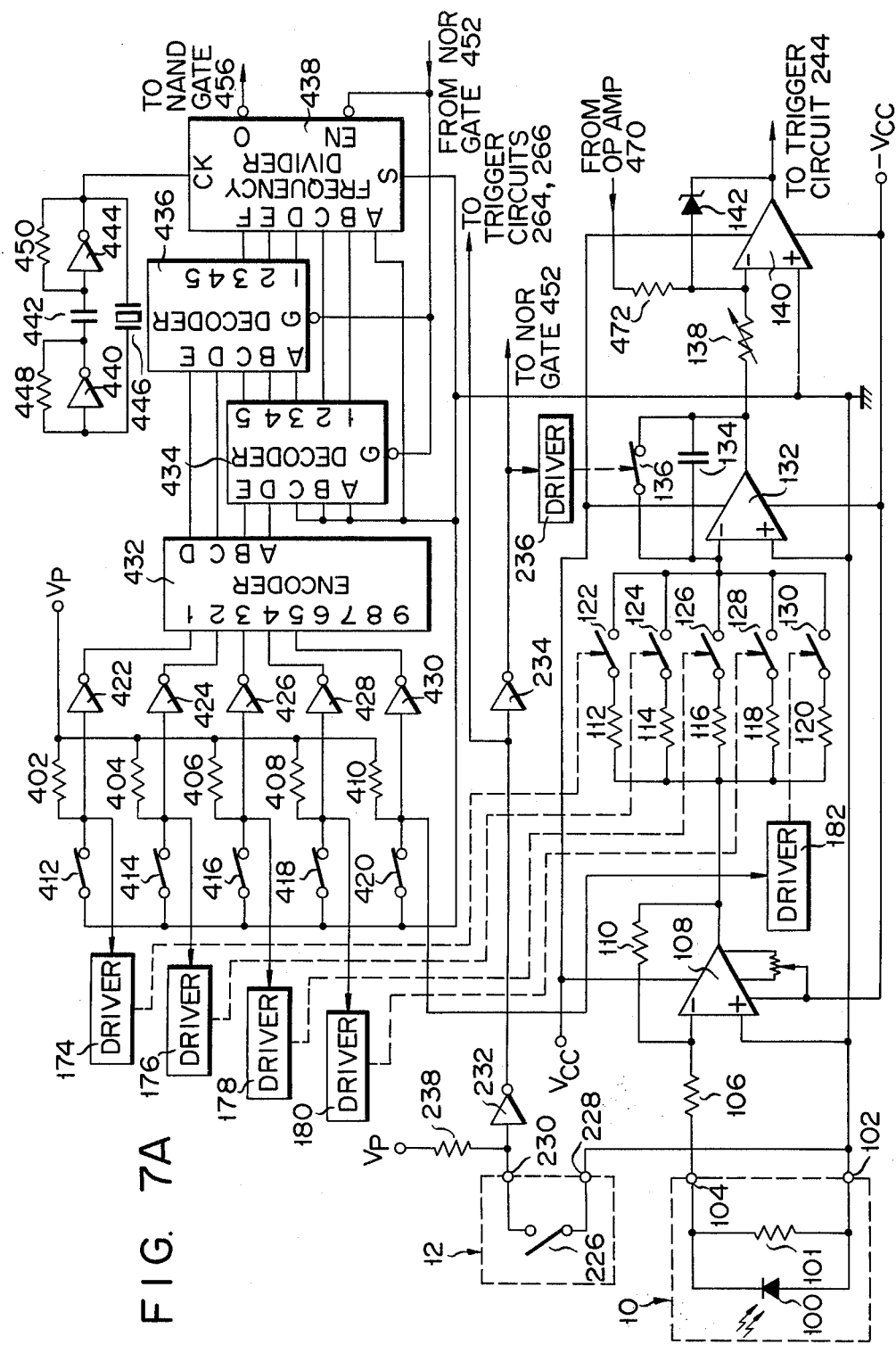

FIGS. 7A and 7B show a circuit diagram of an essential part of a light emission control circuit in a third embodiment of the invention. A constant voltage terminal $V_p$ is connected to resistors 402, 404, 406, 408 and 410, which are connected at the other end to drivers 174, 176, 178, 180 and 182 and also grounded through switches 412, 414, 416, 418 and 420. The switches 412, 414, 416, 418 and 420 are interlocked to a film sensitivity selector. The resistors 402, 404, 406, 408 and 410 are further connected at the other end through inverters 422, 424, 426, 428 and 430 to "1" to "5" input terminals of a decimal-to-binary coded decimal (BCD) encoder 432, respectively. The encoder 432 is constituted by an IC, for instance an "SN74147" by Texas Instrument Company, and it converts a decimal signal coupled to the individual input terminals into a 4-bit BCD signal. The individual bits of the BCD signals are produced from respective "A" to "D" output terminals. The "A" output terminal is the lowest place bit terminal, and the "D" output terminal is the highest place bit terminal. The "A" and "B" output terminals of the encoder 432 are connected to respective "D" and "E" input terminals of a BCD-to-binary decoder 434, and the "C" and "D" output terminals of the encoder 432 are connected to respective "D" and "E" input terminals of a BCD-to-binary decoder 436. The decoders 434 and 436 are constituted by an IC, for instance an "SN74184" by Texas Instrument Company. The decoder 434 has its "A", "B" and "C" input terminals grounded, its "1" and "2" output terminals connected to respective "B" and "C" input terminals of a frequency divider 438 and its "3", "4" and "5" output terminals connected to respective "A", "B" and "C" input terminals of the decoder 436. The "1", "2" and "3" output terminals of the decoder 436 are respectively connected to the "D", "E" and "F" input terminals of the frequency divider 438, which has its "A" input terminal and set terminal S grounded. In the decoders 434 and 436, the "A" input terminal is the lowest place bit terminal, and the "E" input terminal is the highest place bit terminal. The frequency divider 438 is constituted by an IC, for instance as "SN 7497" by Texas Instrument Company, and its "A" terminal is the lowest place bit terminal. The output terminal of an oscillator circuit, which includes a series circuit of an inverter 440, a capacitor 442 and an inverter 444 and a crystal oscillator 446 in parallel with the series circuit, i.e., the output terminal of the inverter 444, is connected to a clock terminal CK of the frequency divider 438. Resistors 448 and 450 are connected in parallel with the respective inverters 440 and 444.

The output terminal of the inverter 234 is connected to one input terminal of a NOR gate 452. The NOR gate 452 forms a flip-flop circuit together with another NOR gate 454. The output terminal of the NOR gate 452 is connected to an enable terminal EN of the frequency divider 438 and also to enable terminals G of the decoders 434 and 436.

The output terminal of the NOR gate 452 is further connected to one input terminal of a NAND gate 456 and also clear terminals CLR of 4-bit counters 458, 460 and 462. The output terminal "0" of the frequency divider 438 is connected to the other input terminal of the NAND gate 456. The output terminal of the AND gate 456 is connected to an input terminal UP of the counter 468. Carry terminals of the counters 468 and 460 are connected to input terminals UP of the respective counters 460 and 462. Thus, the counters 458, 460 and 462 act as a 12-bit counter as a whole. Actually, the QC and QD output terminals of the counter 462 are free terminals, so the system is a 10-bit counter. In the counter 458, the QA output terminal of the counter 458 is the lowest place bit terminal, and in the counter 462 the QB output terminal is the highest place bit terminal. The individual output terminals of the counters 458, 460 and 462 are connected to respective bit address terminals A0 to A9 of a memory 464 and also to respective input terminals of a NAND gate 466. The output terminal of the NAND gate 466 is connected to the other input terminal of the NOR gate 454. The memory 464 is constituted by a PROM having a capacity of 8 bits by 1,024 words, for instance "2708" by Intel Company, and its 8 output terminals D0 to D7 are connected to respective input terminals D0 to D7 of a D/A converter 468. The D/A converter 468 is constituted by, for instance, "4021" by Teledine Company, and its analog output terminal is connected to a noninverting input terminal of an operational amplifier 470. The output terminal of the operational amplifier 470 is connected to its inverting input terminal and also connected through a resistor 472 to the inverting input terminal of the operational amplifier 140.

The operation of the light emission control circuit in this embodiment will now be described. It is assumed that the film sensitivity selector is set to the medium sensitivity, so that the switch 416 is opened. In case of lower film sensitivity the switch 412 or 414 is opened, and in case of higher film sensitivity the switch 418 or 420 is opened. The resistors 402, 404, 406, 408 and 410 have increasing resistances in the mentioned order. With the opening of the switch 416 the driver 178 is energized to close the switch 126. At the same time, the input to the input terminal of the inverter 426 becomes an H level, and a signal representing a decimal number "3" is supplied to the encoder 432. At this time, the output from the output terminal of the inverter 234 is at an H level, so that the output of the NOR gate 452 is at an L level and the inputs to the enable terminals G of the decoders 434 and 436 and the enable terminal EN of the frequency divider 438 are at an L level. Thus, the encoders 434 and 436 and frequency divider 438 are inoperative.

When the synchronization switch 226 is subsequently closed with the depression of the shutter release button, the trigger circuits 264 and 266 are energized to cause commencement of light emission of the flash discharge tube 258. The photodiode 100 detects the emitted light, and the operational amplifier 132 integrates the output signal of the photodiode 100 according to the time constant of the circuit of the resistor 116 and capacitor 134. The output signal $V_i$ of the operational amplifier 132 varies in the manner as shown in FIG. 4A.

Meanwhile, with the closure of the synchronization switch 226 the output of the inverter 234 is changed to an L level to change the output of the NOR gate 452 to an H level. As a result, the counters 458, 460 and 462 are cleared, and the decoder 434 and 436 and the frequency divider 438 is rendered operative. Through the decoders 434 and 436 the signal representing the decimal number "3" is converted into a binary signal corresponding to the decimal number "30", which is supplied to the input terminal of the frequency divider 438. It is assumed that the oscillator circuit is supplying a signal at 640 kHz to the clock terminal CK of the frequency divider 438. The frequency divider 438 frequency divides the 640 kHz signal according to the input signal to supply the frequency division output to one input terminal of the NAND gate 456. If the binary number signal supplied to the "A" to "F" input terminals of the frequency divider 438 represents a decimal number "M" and the frequency of the output signal of the oscillator is $f_1$, the frequency divider 438 provides a signal at a frequency $f_2$ given as follows:

$$f_2 = \frac{M}{26} f_1 = \frac{M}{64} f_1$$

Figure 8A:
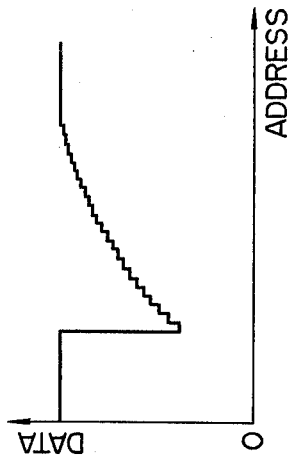
FIGS. 8A, 8B and 8C are graphs illustrating the operation of the third embodiment.
Figure 8B:
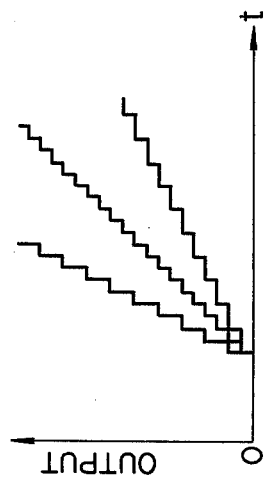
Figure 8C:
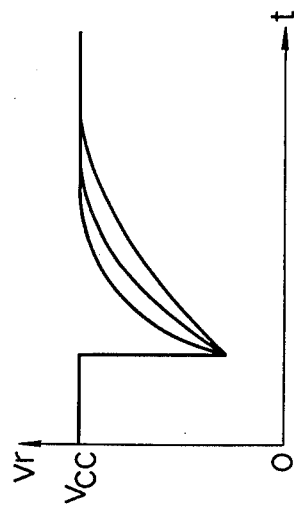

Since "M" is 30 here, the frequency divider 438 at this time provides a signal at a frequency of 300 kHz. "M" takes either a value "10", "20", "30", "40" or "50", so that the frequency of the output signal of the frequency divider 438 is either 100, 200, 300, 400 or 500 kHz. With the appearance of the output signal from the NOR gate 452, which is coupled as an H level signal to one input terminal of the NAND gate 456, the output signal from the frequency divider 438 is coupled through the NAND gate 456 to the input terminal UP of the counter 458. Thus, the 10-bit counter which is constituted by the counters 458, 460 and 462 begins to count the 300 kHz clock signal. The memory 464 is given address specification according to the count of this counter. The data in the specified address is converted through the D/A converter 468 into an analog signal which is supplied to the operational amplifier 470. In the memory 464, data are stored such that they simulate the characteristic of a desired compensating signal when they are arranged in the order of their addresses. Therefore, with changes of the frequency division factor of the frequency divider 438 the output speed of the outputs of the counters 458, 460 and 462 is changed in a manner as shown in FIG. 8B. With the change of the output speed of the counter the speed of reading out data from the memory 464 is changed, and the waveform of the output signal $V_r$ from the operational amplifier 470 is changed as shown in FIG. 8C. This signal $V_r$ is additively combined with the integral output signal $V_i$, and the resultant combination of signals is supplied to the inverting input terminal of the operational amplifier 140. Thus, the output signal of the photodiode 100 is compensated according to the film sensitivity like the preceding embodiments.

When the count in the counters 458, 460 and 462 goes to $2^{10} - 1 = 1023$, the output terminal of the NAND gate 466 is changed to an L level, thus bringing an end to the operation of the decoders 434 and 436 and frequency divider 438. At this time, the counters 458, 460 and 462 are cleared.

In the above embodiment, a compensation curve which accurately corresponds to the error can be provided by appropriately setting the way of storing data in the memory 464, and thus it is possible to realize highly precise compensation for the excess of exposure. In addition, while the output signal of the D/A converter 468 has a staircase-like waveform, the step of the staircase is very fine, and practically there is no effect. The precision may be further improved by permitting the output signal on the D/A converter 468 to be coupled through a simple filter to the operational amplifier 470. Further, while in the above embodiment the counters 458, 460 and 462, oscillator and frequency divider 438 are provided as hardware, they can be provided as software on a microprocessor as well. In this case, the number of component parts can be reduced.

Furthermore, while the above description has been concerned with endoscopic photographing apparatus, this is by no means limitative, and the invention is also applicable to ordinary cameras.

What is claimed is:

1. A light source apparatus using a flash discharge tube operable to illuminate a foreground subject for photographing said foreground subject on a film of given sensitivity, comprising:
    a power source;
    a flash discharge tube and a switching element connected in series combination with said flash discharge tube, said series combination being connected across said power source;
    light receiving means for receiving and photoelectrically converting light reflected by said foreground subject and integrating the received reflected light as a function of the sensitivity of the film being used to produce a signal corresponding to the incident light does;
    compensation means for producing a compensation signal in accordance with a preset film sensitivity; and
    decision means coupled to said compensation means and to said light receiving means for comparing the output signal of said compensation means with the output signal of said light receiving means, and for producing an interruption signal for rendering said switching element nonconductive when the difference between said two output signals reach a predetermined value.

2. The light source apparatus of claim 1, wherein said compensation means comprises an integrating circuit for integrating a voltage supplied to the input of said integrating circuit beginning from the instant of the commencement of light emission from said flash discharge tube, the time constant of said integrating circuit being a function of said preset film sensitivity.

3. A light source apparatus according to claim 1, wherein said compensation means includes a clock signal generator; a frequency divider for frequency dividing the output of said clock signal generator with a frequency division factor corresponding to the preset film sensitivity; a counter for counting the clock signal output of said frequency divider; and a memory in which data monotonously varying for successive addresses are stored and whose addresses are specified according to the output value of said counter.

* * * * *

UNITED STATES PATENT AND TRADEMARK OFFICE
CERTIFICATE OF CORRECTION

PATENT NO. : 4,404,496
DATED : September 13, 1983
INVENTOR(S) : Seiichi HOSODA

It is certified that error appears in the above-identified patent and that said Letters Patent is hereby corrected as shown below:

In the Abstract, on the initial page of the printed patent:

Lines 6 and 7, change "corresponding to the amount of light reflected from the received foreground subject" to --corresponding to the amount of reflected light received from the foreground subject--;

Lines 9 and 10, change "non-conductive with partially as a function of" to --non-conductive partially as a function of--.

Signed and Sealed this

Thirteenth Day of December 1983

[SEAL]

Attest:

GERALD J. MOSSINGHOFF

Attesting Officer   Commissioner of Patents and Trademarks